July 13, 1948.  J. J. BROÏDO ET AL  2,445,288
SHUTTER CONTROL DEVICE FOR MOVING PICTURE APPARATUS
Filed March 1, 1945
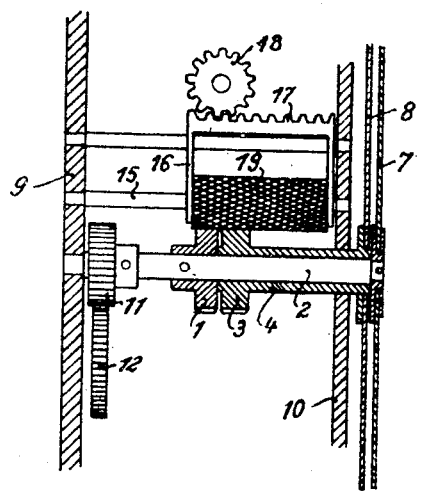
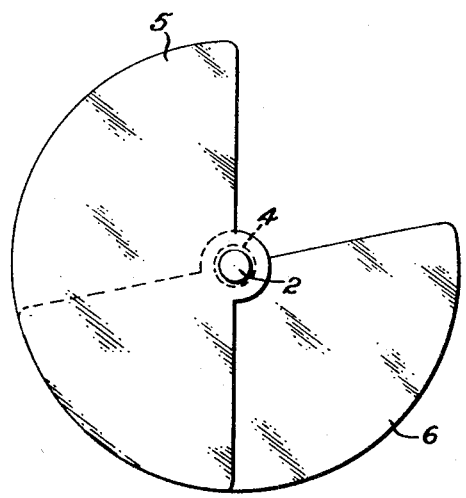
INVENTORS
Jacques Jean Broïdo
Jean Weissbrodt
By Otto Munk
their ATTY.

Patented July 13, 1948

2,445,288

UNITED STATES PATENT OFFICE 2,445,288

SHUTTER CONTROL DEVICE FOR MOVING PICTURE APPARATUS

Jacques Jean Broïdo, Joinville-le-Pont, and Jean Weissbrodt, Paris, France

Application March 1, 1945, Serial No. 580,421
In France November 29, 1941

Section 1, Public Law 690, August 8, 1946
Patent expires November 29, 1961

1 Claim. (Cl. 88—19.3)

The invention relates to moving picture apparatus and more particularly to cameras, and it has for its object to devise a shutter control device such that the opening of the shutter may be altered during the operation, for example in order to obtain fading in or out of pictures or any other similar effects.

Another object of the present invention is to provide a simple and reliable device, in which all play is eliminated.

Further objects and features of the invention will be set forth in the following description, with reference to the accompanying drawing, in which:

Fig. 1 is a diagrammatic sectional view of the shutter control device according to the invention.

Fig. 2 is a plan view of the rotating shutter.

Referring to Fig. 1, the device comprises a first pinion 1, having oblique teeth, rigidly secured to a shaft 2, controlling one of the shutter blades 5 (Fig. 2) and a second pinion 3, having oblique teeth inclined in the reverse direction and rigid with a hollow shaft 4, fitting over shaft 2 and controlling the other blade 6.

Blades 5 and 6, which form a rotary shutter, are secured to flanges 7 and 8 of the corresponding shafts.

Shaft 2 is journalled in walls or partitions 9 and 10 and is driven by means of a pinion 11, in mesh with a spur wheel 12 forming part of the usual mechanism of the moving picture apparatus.

Pinions 1 and 3 are in constant mesh with an intermediate pinion 19 having two sets of intersecting reverse oblique teeth 13 and 14, the pitch of which is such as to make the device irreversible, and the length of the pinions being such that the latter will remain in mesh with pinions 1 and 3 for any position of pinion 19 along its shaft 15.

Axial displacement of said intermediate pinion is controlled by a fork 16 or any other suitable device.

Alternatively, pinion 19 may be rigid with shaft 15, which latter would then be imparted the translation movement.

In order to provide for an accurate translation, the control is preferably effected by means of a rack 17 secured to fork 16 and a toothed wheel 18, although any other similar means may be used to that purpose.

The operation is as follows:

Shaft 2 is driven in rotation by gear 12 and pinion 11 when the camera or the like is set in action. Pinion 1 drives pinion 3 through the intermediate pinion 19. Both blades 5 and 6 are thus rotated synchronously, providing of course that pinions 1 and 3, on the one hand, and 19, on the other hand, are of the same diameter and pitch.

According to the axial position of pinion 19 relatively to pinions 1 and 3, the angular spacing of blades 5 and 6 can be altered, any longitudinal displacement of pinion 19 causing a rotation in reverse direction of pinions 1 and 3, due to the obliquity of the teeth. Control of the shutter opening may be made even during the operation of the camera or the like.

The device possesses a good sensitiveness, since any displacement of pinion 19 causes reverse rotation of the shutter blades.

If the shutter is constituted by blades having reciprocating rectilinear displacements, shafts 2 and 4 carry cams 19 and 20 (Fig. 3) which act on said blades for increasing or reducing the opening of the shutter.

Having now described the nature of this invention, what we claim as new and desire to secure by Letters Patent is:

A shutter control device for moving picture apparatus, comprising in combination two concentric shafts adapted to actuate the respective shutter blades and alter the relative position thereof, an oblique pinion keyed to each of said shafts, means for connecting one of said shafts with the driving mechanism of the moving picture apparatus, a secondary shaft parallel with said concentric shafts, an axially movable intermediate pinion slidable along said secondary shaft and having two intersecting sets of oblique teeth of reverse pitch adapted to mesh with said first-mentioned pinions, respectively, and means for moving said intermediate pinion axially.

JACQUES JEAN BROÏDO.
JEAN WEISSBRODT.

REFERENCES CITED

The following references are of record in the file of this patent:

UNITED STATES PATENTS

| Number | Name | Date |
|---|---|---|
| 1,173,706 | Carleton | Feb. 29, 1916 |
| 1,407,905 | Wenderhold | Feb. 28, 1922 |
| 1,812,056 | Mitchell | June 30, 1931 |
| 1,884,605 | Dina | Oct. 25, 1932 |
| 1,936,206 | Owens | Nov. 21, 1933 |
| 2,131,850 | Wall | Oct. 4, 1938 |

FOREIGN PATENTS

| Number | Country | Date |
|---|---|---|
| 508,690 | France | July 31, 1920 |